E. A. VAUGHAN.
FUEL HEATER FOR INTERNAL COMBUSTION ENGINES.
APPLICATION FILED JUNE 12, 1917.
Patented Apr. 1, 1919.
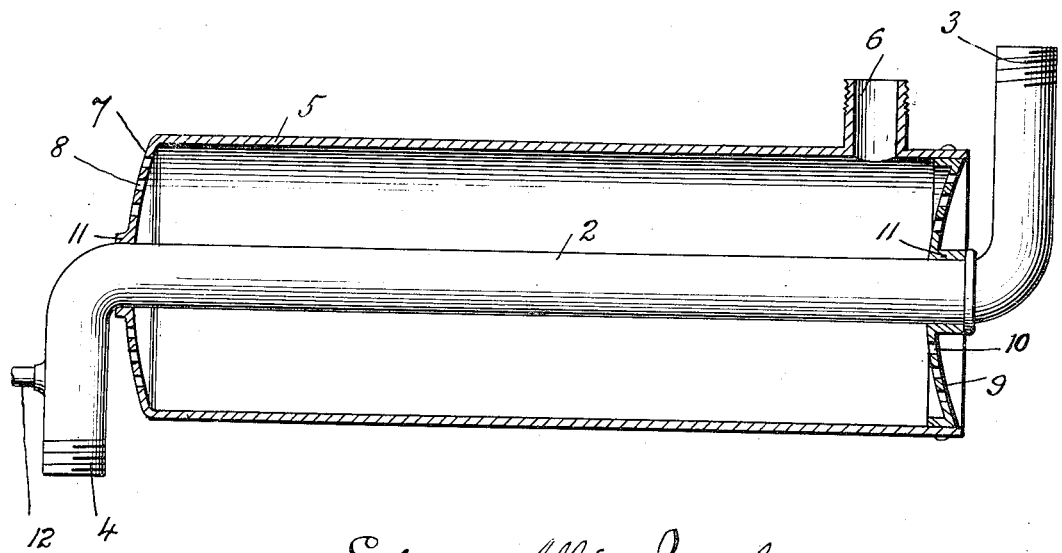
Edgar Allison Vaughan, Inventor

UNITED STATES PATENT OFFICE.

EDGAR A. VAUGHAN, OF SAN ANTONIO, TEXAS.

FUEL-HEATER FOR INTERNAL-COMBUSTION ENGINES.

1,298,835.  Specification of Letters Patent.  Patented Apr. 1, 1919.

Application filed June 12, 1917. Serial No. 174,396.

*To all whom it may concern:*

Be it known that I, EDGAR A. VAUGHAN, a citizen of the United States, residing at San Antonio, in the county of Bexar and State of Texas, have invented certain new and useful Improvements in Fuel-Heaters for Internal-Combustion Engines, of which the following is a specification.

This invention relates to internal combustion engines provided with means for preheating the combustible charge by means of the exhaust products of combustion; and it consists in the novel construction and combination of the parts hereinafter fully described and claimed.

The drawing shows a longitudinal section through a heating device inclosing the inlet pipe of the engine and constructed according to this invention.

The inlet pipe 2 for the mixed air and hydrocarbon forming the combustible charge has a branch or end portion 3 for connecting it to the engine cylinder, and at its other end it has a branch end portion 4 for connecting it to a carbureter, or mixing device, or valve of any approved construction. The main portion 2 of the inlet pipe is inclosed in a drum or chamber 5, and the exhaust pipe of the engine cylinder is connected to a branch 6 on the side of this drum. The drum 5 has one end 7 provided with perforations 8, and at its other end it has a head 9 secured to it and provided with small perforations 10.

The inlet pipe is secured centrally in openings in the said end and head, which have suitable flanges or collars 11 on them. A small pipe 12 for water or other similar moisture is connected to the inlet branch 4, and this moisture is mixed with the charge in the pipe 2. The drum is of relatively large size in proportion to the inlet pipe and the pipe branch 6, so that the exhaust is not blown suddenly through it, but remains in contact with the inlet pipe 2 for some time, and escapes gently and quietly through the perforations 8 and 10 in opposite directions, into the atmosphere. When an engine is provided with a heating device of this sort it is found to effect an economy in the use of the gas or hydrocarbon fuel.

What I claim is:

The combination, with the inlet pipe for the combustible charge, of a drum encircling the inlet pipe and provided with ends secured on the inlet pipe and each having a multiplicity of relatively small outlet openings for the exhaust, said drum having also an inlet for the exhaust on one side and being of relatively large area in proportion to the said inlet pipe, whereby the exhaust is not blown suddenly from the inlet through the said outlet openings.

EDGAR A. VAUGHAN.